C. HESS.
Churn.

No. 78,286.  Patented May 26, 1868.

Witnesses
Wm. V. Sanborn
R. M. Church

Inventor
Charles Hess

United States Patent Office.

CHARLES HESS, OF LYONS CITY, IOWA, ASSIGNOR TO ROBERT T. T. SPENCE, OF SAME PLACE.

Letters Patent No. 78,286, dated May 26, 1868; antedated May 14, 1868.

IMPROVEMENT IN CHURNS.

*The Schedule referred to in these Letters Patent and making part of the same.*

TO ALL WHOM IT MAY CONCERN:

Be it known that I, CHARLES HESS, of Lyons City, Clinton county, State of Iowa, have invented a new and useful Improvement in Dairy-Churns; and I do hereby declare that the following is a full, clear, and exact description thereof, reference being had to the accompanying drawings, and to the letters of reference marked thereon.

The nature of my invention consists in so shaping the arms of the dashers, and adjusting them, as to effectually pack the butter firmly together in one mass, also using, in connection therewith, friction-wheels, thus making a comparatively noiseless churn.

In order to convey a correct idea to others of my invention, I will carefully describe its construction and operation.

In the drawings—

Figure 1:
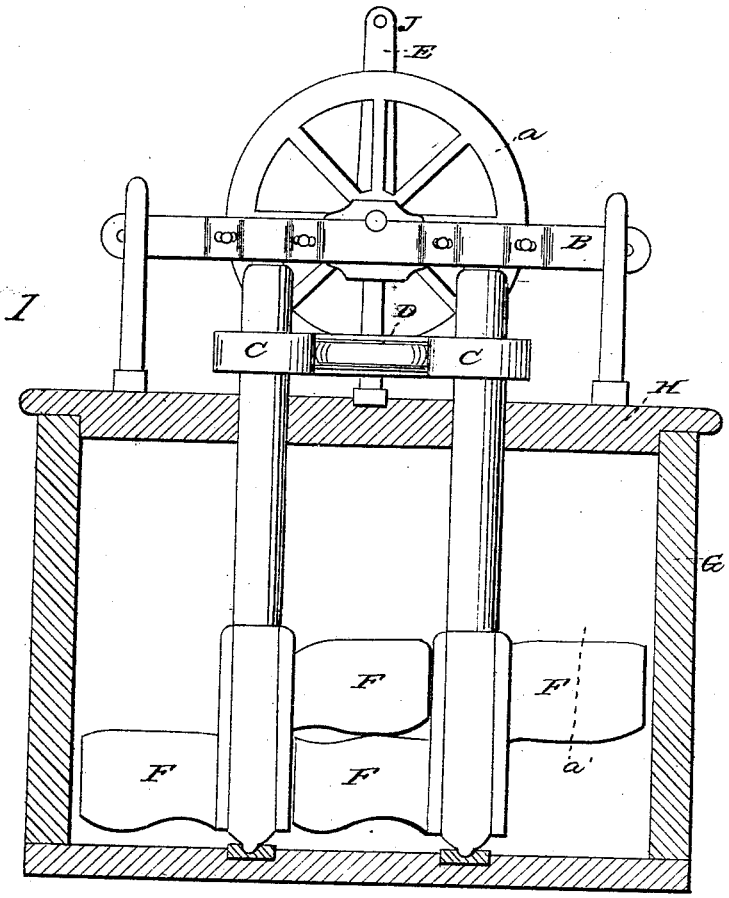
Figure 1 is a front view, the side taken off to show the inside of the churn.
Figure 3:
Figure 3 represents an end view of arm of dasher.
Figure 4:
Figure 2:
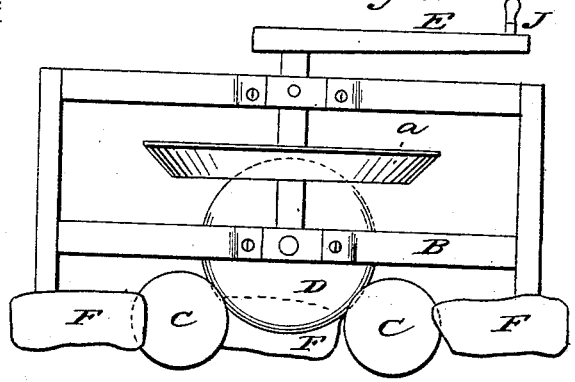
Figure 2 represents a top view, showing the friction-wheels.

Figure 4, section of arm on line a, fig. 1.

The same letters refer to same parts in all the figures.

A represents the friction drive-wheel.

B represents frame to hold the wheels.

C C represent friction-pulleys, on upright dashers, to move arms.

D represents friction-pulley between A and C C.

E represents crank.

F F F F, arms to agitate the cream.

G, body of churn.

H, cover of churn.

J, crank-handle.

I construct the body of the churn of any suitable material, attaching to the top or cover a frame, so adjusted as to hold the friction-pulleys in place, so as to get the requisite amount of power, yet so arranged as to be easily removed, thus giving control of all parts for any purpose.

The crank-pulley A is made of any suitable material, with its face bevelled to fit pulley D, which is a horizontal pulley, and faced with rubber, or any other material that will hold. This pulley D is adjusted to fit and gives motion to pulleys C C, to the shafts of which are attached the arms F F F F, which agitate the cream.

Now, the operation of this device is as follows: By turning the wheel A by crank, E, motion is given to the dashers, to which are attached the arms F F F F, which, rapidly passing through the cream, soon change it to butter. Now, by giving the crank an oscillating motion, the butter is gathered, and firmly packed in one corner of the churn, the peculiar form of the arm acting like a paddle or hand in beating out the milk, and gathering the butter.

In order to cleanse this churn, I have but to remove the top or cover, and the inside is open, and clear for washing.

What I claim as my invention, and desire to secure by Letters Patent, is—

The combination and arrangement of the friction-pulleys A, D, C C, with the peculiar ogee curved-shaped arms or paddles F F F F, when constructed and arranged for the purposes above set forth.

CHARLES HESS.

Witnesses:
W. W. SANBORN,
R. M. CHURCH.